United States Patent
Sorensen et al.

(10) Patent No.: US 6,290,869 B1
(45) Date of Patent: Sep. 18, 2001

(54) LUBRICANT ESTER

(75) Inventors: Kent Sorensen; Keith Ogemark; Carl-Axel Sjogreen, all of Perstop (SE)

(73) Assignee: Perstorp AB, Perstorp (SE)

( * ) Notice: Subject to any disclaimer, the term of this patent is extended or adjusted under 35 U.S.C. 154(b) by 0 days.

(21) Appl. No.: 09/202,910

(22) PCT Filed: Jun. 23, 1997

(86) PCT No.: PCT/SE97/01116

§ 371 Date: Mar. 25, 1999

§ 102(e) Date: Mar. 25, 1999

(87) PCT Pub. No.: WO97/49786

PCT Pub. Date: Dec. 31, 1997

(30) Foreign Application Priority Data

Jun. 24, 1996 (SE) .................................................. 9602465

(51) Int. Cl.$^7$ ...................................................... C09K 5/00
(52) U.S. Cl. .................................. 252/68; 252/71; 252/79
(58) Field of Search .............................. 252/56 D, 56 R, 252/56 S, 68, 79, 185, 213, 71

(56) References Cited

U.S. PATENT DOCUMENTS 5,202,044 * 4/1993 Hagihara et al. ....................... 252/68
5,374,366 * 12/1994 Nakahara et al. .................. 252/56 D

OTHER PUBLICATIONS

English language abstract of Japanese Patent Publication No. JP 06025683 A.

English language abstract of Japanese Patent Publication No. JP 3088892.

* cited by examiner

*Primary Examiner*—Yogendra N. Gupta
*Assistant Examiner*—Derrick G. Hamlin
(74) *Attorney, Agent, or Firm*—Scully, Scott, Murphy & Presser

(57) ABSTRACT

A lubricant ester having enhanced hydrolytic stability is disclosed. The ester is a mono or diester of 2-ethyl-2-butyl-1,3-propanediol or an alkoxylate thereof and at least one carboxylic acid having 5–10 carbon atoms. The invention in a further aspect refers to a refrigeration working fluid comprising said ester and at least one halocarbon refrigerant.

11 Claims, No Drawings

LUBRICANT ESTER

The present invention relates to a lubricant ester having enhanced hydrolytic stability. The ester is in particular intended as lubricant in refrigeration systems. The invention refers in a further aspect to a refrigeration working fluid comprising at least two components, whereby at least one is a halocarbon refrigerant and at least one is said lubricant ester.

Esters and polyesters used as lubricants are well-known in the art and used in a large number of application including automotive and aviation oils, metal working fluids, gear oils, turbo oils, hydraulic fluids and refrigeration lubricants. Refrigeration systems such as refrigerators, freezers, air conditioners, heat pumps and the like normally include a circulating and heat transferring refrigerant. Lubricants for refrigeration systems must be compatible and miscible within a wide range of temperatures with said refrigerant so that resulting refrigeration working fluids obtain a non-obstructing composition and so that moving parts in the system are properly lubricated. The properties and performances of halocarbon refrigerant fluids are well-known and so is also the environmental effects of those containing chlorine, which fluids presently to an increasing extent are replaced by substantially chlorine free compounds such as fluorocarbons. Ester and polyester based synthetic lubricants are also well-known products which to a high extent is used as lubricants in various refrigeration systems. Many of the presently used refrigeration lubricants, mineral based as well as synthetic, exhibit an overall limited compatibility, miscibility and lubricating ability or most commonly a temperature dependent compatibility, miscibility and lubricating ability, especially at low temperature and in combination with fluorocarbons.

The development efforts in regard of lubricants for various refrigeration system have for some time, more or less successfully, been focused on obtaining lubricating esters and polyesters being at all temperatures, especially at low temperatures, compatible and miscible with said refrigerants, especially fluorocarbon refrigerants. The lubricant must in order to provide proper lubrication over a wide range of temperatures have a low pour point and a high viscosity index. The problem of obtaining excellent miscibility at a very wide range of temperatures is most pronounced when chlorine containing halocarbon refrigerants and other heat transfer fluids are replaced with substantially chlorine free fluorocarbons. The fluorocarbons considered to be the most interesting and thus in focus for said development are isomers of tetrafluoroethane, such as 1,1,1,2-tetrafluoroethane commonly known as "Refrigerant 134a". The solubility in fluorocarbons is for many esters and polyesters low in general or reduced at low or extremely low temperatures. The solubility in fluorocarbons is often judged by the temperature, the so called miscibility temperature, at which a solution of a compound such as said esters and polyesters in above mentioned "Refrigerant 134a" separates. The miscibility temperature of a 30% by weight solution of a lubricant ester is often to be found within the interval of +10° C. and −30° C.

A synthetic lubricant must be formulated to provide required lubricating properties at a temperature interval as wide as possible. A well performing lubricant should to provide adequate lubricity have as invariable a viscosity as possible over a wide range of temperatures, however, yet being miscible with the refrigerant. Miscibility at very low temperatures is especially difficult to obtain. An increased as well as a decreased viscosity normally negatively influence the lubricating ability of the ester or polyester. A lubricant must, furthermore, in most system exhibit a very high thermal stability and a high flash point.

Major drawbacks in the use of lubricating esters and polyesters are that many esters and polyesters have a limited thermal, chemical and especially hydrolytic stability and resistance. These properties are dependent of for instance the choice of raw materials, the purity of said raw materials, the number of ester links and the acid and hydroxyl values.

The present invention provides a lubricant ester primarily intended as lubricant in various refrigeration systems, whereby resulting refrigeration working fluids can comprise said ester. The ester can also advantageously be used in automotive and aviation oils, metal working fluids, gear oils, turbo oils, hydraulic fluids. The lubricant ester has an enhanced hydrolytic stability as well as excellent miscibility in halocarbon, especially fluorocarbon, refrigerants. The ester is a mono or preferably a diester of a 2-ethyl-2-butyl-1,3-propanediol or alkoxylated, such as ethoxylated, propoxylated, butoxylated or phenylethoxylated, 2-ethyl-2-butyl-1,3-propanediol and at least one monocarboxylic acid having 5–10 carbon atoms.

The superior and excellent properties are quite unexpected and contrary to expected and predicted properties, such as lubricity, compatibility and especially hydrolytic stability compared to other 2,2-substituted 1,3-propanediols, such as 2,2-diethyl-1,3-propanediol and 2-methyl-2-ethyl-1,3-propanediol.

Preferred embodiments of the present invention are mono or preferably diesters wherein the carboxylic acid is selected from the group consisting of valeric acid, isovaleric acid, hexanoic acid, isohexanoic acid, heptanoic acid, isoheptanoic acid, octanoic acid, isooctanoic acid, nonanoic acid or isononanoic. Further preferred carboxylic acids are mono, di or trialkyl hexanoic acids, such as 2-methylhexanoic acid, 2-ethylhexanoic acid, 2,2-dimethylhexanoic acid, 3,5,5-trimethylhexanoic acid or mixtures thereof and/or therewith. The ester is in the most preferred embodiments a diester wherein the carboxylic acid is isooctanoic acid or 3,5,5-trimethylhexanoic acid.

Alkoxylation of 2-ethyl-2-butyl-1,3-propanediol is performed by adding, in accordance with known procedures, an alkylene oxide, such as ethylene oxide, propylene oxide, butylene oxide and/or phenylethylene oxide, to said diols. The molar ratio is preferably 1:1 to 1:20 as diol to alkylene oxide.

In a further aspect the present invention refers to a refrigeration working fluid comprising at least one halocarbon refrigerant, such a fluorocarbon or a chlorofluorocarbon, and in addition thereto said mono or diester. The halocarbon is suitably a fluoroethane selected from the group consisting of i) a difluoroethane, such as 1,1-difluoroethane;
ii) a trifluoroethane, such as 1,1,1-trifluoroethane;
iii) a tetrafluoroethane, such as 1,1,1,2-tetrafluoroethane; and
iv) a pentafluoroethane.

A refrigeration working fluid comprises normally 1–60% by weight of the ester and 40–99% by weight of the halocarbon and optionally in addition thereto one or more additives such as stabilisers, antioxidants and the like.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever. Embodiment Examples 1–8 show:

Example 1: Preparation of a lubricant ester from 2-ethyl-2-butyl-1,3-propanediol and isooctanoic acid.
Example 2: Preparation of a lubricant ester from 2-ethyl-2-butyl-1,3-propanediol and 3,5,5-trimethylhexanoic acid.
Example 3: Evaluation of the lubricity of the esters of Examples 1 and 2.
Example 4: Determination of the compatibility of the esters of Examples 1 and 2 and a fluorocarbon.
Example 5: Evaluation of hydrolytic stability of the esters of Examples 1 and 2.
Example 6: Preparation of a comparative lubricant ester from 2,2-diethyl-1,3-propanediol and 3,5,5-trimethylhexanoic acid.
Example 7: Preparation of a comparative lubricant ester from 2-methyl-2-ethyl-1,3-propanediol and 3,5,5-trimethylhexanoic acid.
Example 8: Hydrolytic stability of the esters according to Example 2, 6 and 7.

EXAMPLE 1

Preparation of a Lubricant Ester from 2-ethyl-2-butyl-1,3-propanediol and Isooctanoic Acid.

2.0 moles of 2-ethyl-2-butyl-1,3-propanediol, 4.8 moles of isooctanoic acid, 45.0 g of heptane and 1.8 g of p-toluenesulphonic acid were charged in a 4-necked reaction flask equipped with stirrer, pressure gauge, nitrogen inlet, thermometer, cooler and water trap (Dean-Stark). The temperature was during 150 minutes raised to 150° C. The temperature was maintained until the esterification was completed. Heptane and unreacted isooctanoic acid were now removed by vacuum distillation. Obtained product was finally, at 130° C., neutralised with Ca(OH)$_2$, followed by a vacuum evaporation of neutralisation water and by a filtration at 100° C.

Obtained ester exhibited the following properties:

| | |
|---|---|
| Acid value, mg KOH/g: | 0.07 |
| Hydroxyl value, mg KOH/g: | 4 |
| Viscosity at 40° C., cSt.: | 15.8 |
| Viscosity index: | 70 |
| Pour point, ° C.: | <−42 |

EXAMPLE 2

Preparation of a Lubricant Ester from 2-ethyl-2-butyl-1,3-propanediol and 3,5,5-trimethylhexanoic Acid.

2.0 moles of 2-ethyl-2-butyl-1,3-propanediol, 4.8 moles of 3,5,5-trimethylhexanoic acid, 47.0 g of heptane and 1.9 g of p-toluenesulphonic acid were charged in a 4-necked reaction flask equipped with stirrer, pressure gauge, nitrogen inlet, thermometer, cooler and water trap (Dean-Stark). The temperature was during 150 minutes raised to 150° C. The temperature was maintained until the esterification was completed. Heptane and unreacted 3,5,5-trimethylhexanoic acid were now removed by vacuum distillation. Obtained product was finally, at 130° C., neutralised with Ca(OH)$_2$, followed by a vacuum evaporation of neutralisation water and by a filtration at 100° C.

Obtained ester exhibited the following properties:

| | |
|---|---|
| Acid value, mg KOH/g: | 0.05 |
| Hydroxyl value, mg KOH/g: | 4 |
| Viscosity at 40° C., cSt.: | 23.2 |
| Viscosity index: | 82 |
| Pour point, ° C.: | <−42 |

EXAMPLE 3

The lubricity of the lubricant esters according to the invention (Examples 1 and 2) were evaluated according to ASTM D2266 (4-Ball Wear Test), whereby scar (mm) and acidity increase, ΔTAN (mg KOH/g) were determined.

Result

| | Example 1 | Example 2 |
|---|---|---|
| Scar, mm: | 0.66 | 0.80 |
| Acidity increase, ΔTAN, mg KOH/g: | +0.01 | +0.04 |

The esters according to the invention exhibit a very low scar value implying excellent lubricity and an exceptionally low acidity increase implying excellent stability.

EXAMPLE 4

The compatibility of the lubricant esters of Examples 1 and 2 and a fluorocarbon was determined as the temperature (the miscibility temperature) at which a 30% by weight solution of said esters in "Refrigerant 134a" (Solkan 134a, Solvay Fluor und Derivate GmbH, Germany) separates.

Result

| | Example 1 | Example 2 |
|---|---|---|
| Miscibility temperature, 30% in "134a", ° C.: | −18 | −24.5 |

The esters according to the invention were at temperatures above the miscibility temperature miscible with "Refrigerant 134a" in all proportions.

EXAMPLE 5

The hydrolytic stability of the lubricant esters of Example 1, 2 and 3 were evaluated according to ASTM D2619-88 ("Coca Cola Test"), whereby the viscosity change at 40° C.,
the acidity increase, ester and water phase, and
the percentage insolubles formed, was determined.

Result

|  | Example 1 | Example 2 |
|---|---|---|
| Viscosity change at 40° C., %: | +0.9 | −0.8 |
| Acidity increase, ester phase, mg KOH/g: | +0.04 | +0.81 |
| Acidity increase, water phase, mg KOH/g: | +0.03 | +0.04 |
| Insolubles, %: | 0.03 | 0.06 |

The results show that the lubricant esters according to the present invention exhibit a superior hydrolytic stability.

EXAMPLE 6 (COMPARATIVE EXAMPLE)

Example 2 was repeated with the difference that 2 moles of 2,2-diethyl-1,3-propanediol was used instead of 2-ethyl-2-butyl-1,3-propanediol.

EXAMPLE 7 (COMPARATIVE EXAMPLE)

Example 2 was repeated with the difference that 2 moles of 2-methyl-2-ethyl-1,3-propanediol was used instead of 2-ethyl-2-butyl-1,3-propanediol.

EXAMPLE 8

The hydrolytic stability exhibited by esters according to Example 2, 6 and 7 was determined.

0.2 g of the ester was dissolved in 50 ml of acetone and 2 mmole of NaOH and 10 ml of water were added. The mixture was stored at room temperature and samples were drawn at pre-determined intervals for HPLC determination of released acid and most important unhydrolysed remaining ester.

Result

|  | Released acid, % | | | Remaining ester, % | | |
|---|---|---|---|---|---|---|
| Time hrs. | Ex. 2 | Ex. 6 | Ex. 7 | Ex. 2 | Ex. 6 | Ex. 7 |
| 9 | 18 | 20 | 24 | 79 | 74 | 62 |
| 15 | 23 | 25 | 27 | 68 | 62 | 43 |
| 18 | 25 | 27 | 28 | 64 | 56 | 38 |
| 22 | 28 | 30 | 30 | 59 | 51 | 32 |
| 28 | 31 | 32 | 32 | 48 | 41 | 24 |

Above table shows that the 2-ethyl-2-butyl-1,3-propanediol ester in comparison to other 2,2-substituted 1,3-propanediols, exhibits a substantial and unpredictable increase in hydrolytic stability (up to 100%) with a substantially higher percentage unhydrolysed ester remaining in the prepared mixture.

What is claimed is:

1. A lubricant ester comprising a monoester or a diester of 2-ethyl-2-butyl-1,3-propanediol or an alkoxylated 2-ethyl-2-butyl- 1,3-propanediol and at least one monocarboxylic acid having 5 to 10 carbon atoms.

2. An ester according to claim 1 wherein said at least one monocarboxylic acid is selected from the group consisting of valeric acid, isovaleric acid, hexanoic acid, isohexanoic acid, 2-methylhexanoic acid, 2-ethylhexanoic acid, 2,2-dimethylhexanoic acid, 3,5,5-trimethylhexanoic acid, heptanoic acid, isoheptanoic acid, octanoic acid, isooctanoic acid, nonanoic acid and isononanoic acid.

3. An ester according to claim 2 wherein said ester is a diester of 2-ethyl-2-butyl-1,3-propanediol and isooctanoic acid or 3,5,5-trimethylhexanoic acid.

4. An ester according to claim 1 wherein said ester is a reaction product of said alkoxylated 2-ethyl-2-butyl-1,3-propanediol, said alkoxylated 2-ethyl-2-butyl-1,3-propanediol obtained by addition of an alkylene oxide to said 2-ethyl-2-butyl-1,3-propanediol in a molar ratio of said 2-ethyl-2-butyl-1,3-propanediol to said alkylene oxide in the range of between 1:1 and 20:1.

5. An ester according to claim 4 wherein said alkylene oxide is selected from the group consisting of ethylene oxide, propylene oxide, butylene oxide and phenylethylene oxide.

6. A refrigeration working fluid comprising said lubricating ester of any one of claims 1, 3 or 4 and a halocarbon refrigerant.

7. A refrigeration working fluid according to claim 6 wherein said halocarbon refrigerant is a fluorocarbon or a chlorofluorocarbon.

8. A refrigeration working fluid according to claim 7 wherein said halocarbon refrigerant is a fluorocarbon, said fluorocarbon selected from the group consisting of a difluoroethane, a trifluoroethane, a tetrafluoroethane and a pentafluoroethane.

9. A refrigeration working fluid according to claim 7 wherein said halocarbon refrigerant is a fluorocarbon, said fluorocarbon selected from the group consisting of 1,1-diflurorethane, 1,1,1-triflurorethane and 1,1,1,2-tetraflurorethane.

10. A refrigeration working fluid according to claim 6 wherein said ester comprises 1 to 60% by weight and said halocarbon refrigerant comprises 40 to 99 by weight, said fluid optionally including at least one additional additive.

11. A refrigeration working fluid according to claim 10 wherein said additional additive is present and is selected from the group consisting of a stabilizer, an antioxidant and mixtures thereof.

* * * * *

UNITED STATES PATENT AND TRADEMARK OFFICE
CERTIFICATE OF CORRECTION

PATENT NO. : 6,290,869 B1  
DATED : September 18, 2001  
INVENTOR(S) : Kent Sorensen et al.

Page 1 of 1

It is certified that error appears in the above-identified patent and that said Letters Patent is hereby corrected as shown below:

<u>Column 6,</u>  
Line 51, "diflurorethane" should read -- difluoroethane --  
Line 51, "triflurorethane" should read -- trifluoroethane --  
Line 52, "tetraflurorethane" should read -- tetrafluoroethane --

Signed and Sealed this

Thirtieth Day of April, 2002

Attest:

Attesting Officer

JAMES E. ROGAN  
*Director of the United States Patent and Trademark Office*